Patented July 12, 1938

2,123,198

UNITED STATES PATENT OFFICE 2,123,198

TREATMENT OF ANTITOXINS AND THE LIKE

Ivan A. Parfentjev, Nyack, N. Y., assignor to Lederle Laboratories, Inc., New York, N. Y., a corporation of Delaware No Drawing. Application October 23, 1936, Serial No. 107,227

9 Claims. (Cl. 167—78)

This invention relates to the purification of antitoxin solutions or the like by a method which includes the selective digestion of certain of the proteins contained in serum, plasma, or other body fluids. The invention is particularly concerned with the application of this method to the concentration of such materials containing antibodies, to a degree hitherto considered unattainable.

This application is in part a continuation of my application Serial No. 747,532, filed October 9, 1934, now Patent No. 2,065,196, dated December 22, 1936.

Serum from which antitoxins and the like are customarily obtained, contains several different proteins which are principally considered as albumins, euglobulins and pseudoglobulins. The antibodies contained in the serum are ordinarily associated almost entirely with the pseudoglobulin. Hence in any method of purifying and concentrating serum solution containing valuable antibodies, it is considered desirable to remove the albumin and euglobulin as completely as possible without destroying the antibodies associated with the pseudoglobulin fraction.

The antibodies in the serum of a horse or other animal immunized against the toxins of disease-producing organisms are called antitoxins. Antitoxins are associated with the globulin fractions and chiefly with the pseudoglobulin fraction. The antibodies produced by immunizing a horse against the organisms themselves, which produce disease, are referred to as antibacterial and antivirus antibodies and, like the antitoxins, are associated with the globulin fractions.

The customary method of refining and concentrating antitoxins has entailed making fractional precipitations of the different proteins contained in the native antitoxic serum, such precipitations being made by the addition of various inorganic salts in differing concentrations. The salt most commonly used for this purpose is ammonium sulfate.

Thus, with ammonium sulfate used in a concentration of 30 to 33% of a saturated solution, a globulin precipitate containing very little antitoxin is obtained. This fraction is generally referred to as the euglobulin fraction and is commonly filtered off and discarded. The filtrate resultant from this first precipitation is then treated with more ammonium sulfate until the concentration is 50% by volume of saturated ammonium sulfate solution. At this concentration, a further precipitation is obtained which is commonly referred to as the pseudoglobulin fraction and contains the antitoxin. There remains in solution practically all of the albumin fraction originally present in the serum, and this solution is mostly free from antitoxins, so that in the case of the second precipitation, the filtrate is discarded and the precipitate saved. The precipitate is redissolved and this solution is generally used as such.

So far as is known, in all the various antitoxins, for whatever disease, the antibodies are associated with this same pseudoglobulin fraction of the immune serum. In general, any method of purification that has been found effective for one kind of antitoxin has likewise been found applicable in principle for every other known antitoxin, including diphtheria antitoxin, tetanus antitoxin, hemolytic streptococcus antitoxin, staphylococcus antitoxin, perfringens antitoxin, vibrion septique antitoxin, oedematiens antitoxin, histolyticus antitoxin, sordelli antitoxin, botulinus type I antitoxin, botulinus type II antitoxin, and the like.

I have discovered that it is possible to purify and concentrate the antitoxin in antitoxin serum or like solution containing valuable antibodies by treating the solution with proteolytic enzymes under such conditions as to prevent any substantial destruction of the antibodies. In this way, I am able to digest the valueless albumin fraction, practically completely, with substantially no destruction of antibodies contained in the globulin fraction. My process further contemplates separation of the euglobulin fraction, which is practically free from antibodies, from the pseudoglobulin fraction with which the antibodies are principally associated. And still further, I have found that I may concentrate and purify my antitoxin solutions to an even greater extent by treating the material after the digestion to other precipitation, filtration, dialysis, absorption, etc. steps, all carried out under suitable conditions and with proper materials as set forth in greater detail below.

In one application of my digestion method, the fraction of serum proteins commonly considered as albumins digests first and to such a degree that the products of digestion are largely dialyzable; that fraction commonly referred to as euglobulins is partially digested and the remainder is precipitated by the acid present, the digestion being carried out under acid conditions (the acidity being not greater than about pH 4) and that fraction referred to as pseudoglobulins while digested to some extent, at least in part remains in solution retaining practically all of the original antibody activity.

The following is a specific example of one method of carrying out my procedure as applied to the purification of diphtheria antitoxin. It is understood that the example is given merely by way of illustration and not in limitation.

A suitable quantity of diphtheria antitoxin serum is diluted with two times its volume of saline solution and the mixture acidified slightly to about pH 6. To this mixture I add an amount of U. S. P. pepsin equivalent to about 20 grams per liter of original serum. The hydrogen ion concentration of the mixture is then adjusted to a pH of about 4.6. This adjustment of pH is preferably made as soon as possible after the addition of the pepsin. Thereupon the entire mixture is digested for about two days at a temperature of about 37° C. during which time about 70% of the protein will have been digested or changed so that it is non-coagulable on heating.

The digested material is filtered to separate solid materials (euglobulin, etc.) from the liquid. The separated liquid is neutralized and further treated by subjecting it to ultra-filtration using a suitable colloidal membrane in any proper apparatus. The ultra filtration operation serves to concentrate the colloidal solution containing the antitoxin materials. This is accomplished by the action of the colloidal membrane which permits clear liquid to pass through the membrane but which retains the dispersed particles. Liquid which passes through the membrane is valueless and is discarded. The filtration is continued until the colloidal concentrate obtained by the ultrafiltration has a specific gravity of about 1.025 to 1.030. This liquid is a transparent and clear product which may be used, if desired, as the finished antitoxin material. This solution is a highly purified, concentrated antitoxin having a potency considerably greater than the original serum and also a greater than antitoxin concentrates obtained by the customary ammonium sulfate method.

However, I have found that it is possible to process the concentrate from the ultra-filtration described above, and thereby obtain an even superior antitoxin solution. To this end I add to the described concentrate solid ammonium sulfate in the amount of 260–290 grams per liter of concentrated solution. The ammonium sulfate quickly dissolves in the liquid and causes the precipitation of a fraction of coagulable proteins (pseudoglobulins) which contain practically all of the antitoxins. There remain in solution the residual peptones, proteoses and other split products of digestion not removed by ultra-filtration, all of which are undesirable and worthless in the final antitoxin preparation. The precipitate is then separated from the liquid in which it is suspended and the liquid is discarded.

The last mentioned precipitate comprises chiefly a remaining pseudoglobulin fraction with substantially the entire antitoxin content of the original serum. This precipitate is dissolved in a small amount of water and the resulting solution is subjected to dialysis to remove ammonium sulfate and other undesired materials. In dissolving the precipitate, it is preferred that the least amount of water be used that will give complete solution, since the dialysis takes place more efficiently, the more concentrated the solution.

The dialysis of the solution may be carried out in any suitable apparatus, using any suitable membrane. One method commonly employed is to place the solution to be dialyzed in a bag or other convenient container having a dialyzing membrane of cellophane or other suitable material, and to suspend this bag or the like in a bath of water. By means of a suitable mechanical arrangement the bag or the like is subjected to an up-and-down motion in the bath. In about 24 hours, at room temperature, dialysis is sufficiently complete. The dialysis method using cellophane bags without the motion ordinarily takes four days for completion and must be carried out in the cold to prevent bacterial growth.

After the dialysis is complete, the solution is taken out of the dialyzer and is diluted by the addition of two to three times its volume of water. To the resultant liquid which has been largely freed from interfering peptones, etc., I prefer to add a suspension of tricalcium phosphate in water, in the proportion of about 8 to 20% by volume of the suspension to the total volume. The tricalcium phosphate suspension contains about 3 to 5% very finely divided solid calcium phosphate. The entire mixture is then stirred for about 24 hours at room temperature and the calcium phosphate is filtered from the solution. It is found that the calcium phosphate absorbs 30 to 50% of the inactive coagulable proteins from the solution. The phosphate also absorbs lipoids, pepsin, and coloring materials which were in the solution, with the result that the products are almost colorless or water-white. All of this is accomplished without any substantial loss of antibody.

The filtrate obtained after removal of the calcium phosphate is preferably subjected to an ultra-filtration operation, using a suitable colloidal membrane. By this operation, the final concentration is regulated so that the liquid obtained has a specific gravity of about 1.060. This material is a highly purified, concentrated antitoxin solution which is exceedingly transparent, clear and substantially colorless. The finished material has an average potency of about ten times that of the original serum. This purified and concentrated antitoxin in about neutral solution is further characterized by the fact that it is relatively stable and that no precipitate forms on standing, even over long periods of time.

The details of the described procedure may be varied within certain limits, as may be indicated by experience. The finished antitoxin may be prepared by digesting, in accordance with the present method, anti-diphtheric blood, serum or plasma. My method also may be applied to the further purification and concentration of antitoxin previously prepared by any other method, e. g., the ammonium sulfate method.

One of the outstanding features of my process is that the pepsin or similar enzyme in proper concentration, protects the antibody activity against destruction by acid. I have shown this to be true by adding the same amount of acid to similar antibody solution to which pepsin had not been added, and in this case the antibody destruction is considerably greater. Further, under the conditions of my process, the globulin fraction is more resistant to digestion than the albumin fraction, so that practically a total destruction of the albumins may be achieved without there being enough digestive action on the pseudoglobulin fraction to destroy an appreciable amount of its antibody activity.

While I prefer to add the enzyme to the serum prior to the final adjustment of acidity, it will be obvious that my process can be carried out by adding the enzyme with the proper amount of acid to the serum simultaneously. It is also possible to adjust the acidity to the desired point, not exceeding pH 4, prior to the addition of the enzyme, provided that the enzyme is added to the acidified serum very shortly after acidification, since any considerable delay would cause the acidity to destroy a substantial amount of the antibodies. Thus it is seen that, by the use of the proper technique, the enzyme may be added before, at, or after acidification without substantial destruction of the antibodies, and such modifications are clearly within the purview of the present invention.

It is best that the digestion be carried out in diluted solutions since with too high concentrations, the proteolytic enzymes may fail to protect the antibodies sufficiently. Ordinarily this dilution is to the extent of about two to four times the original volume. The hydrogen ion concentration is adjusted by adding a corresponding amount of acid or alkali, as may be needed, and a pH of 4 to 5 is generally suitable. The time of digestion may be varied, depending upon variations in dilution, pH, temperature, the degree of digestion desired and the like.

For best results I prefer to use the step of salting-out that portion of the proteins with which the antibodies are associated after digestion and ultra-filtration and prior to the treatment with calcium phosphate. This step eliminates the peptones and proteoses which interfere with the absorptive action of the calcium phosphate. In place of ammonium sulphate as the salting-out medium, I may use such other suitable neutral salts as sodium sulphate, sodium chloride, etc.

The use of ammonium sulphate or similar salts for treating the liquid obtained from my digestion operation, is considerably different from the prior art use of ammonium sulphate. In the present process, the digestion step eliminates the albumin and euglobulin fractions to such an extent that a single precipitation with the salt is sufficient to bring down the remaining pseudo-globulin fraction with which the antibodies are associated. The previously used fractional precipitations using varying strengths of ammonium sulphate merely served to separate the antibodies from certain proteins which by my method have already been disposed of.

The tricalcium phosphate utilized as the absorbent in one of the later stages of my process is preferably in the form of a very finely divided material. In fact, I have found that the more finely divided the calcium phosphate, the better are the results obtained. In place of tricalcium phosphate I may utilize the corresponding phosphates of the other alkaline earth metals such as magnesium, barium, lithium, strontium, etc. or mixtures of the various phosphates.

The treatment with calcium phosphate is especially effective in combination with the digestion step, since the digestion eliminates considerable undesirable material from the antibody solution and the absorption by the calcium phosphate is more efficient. Furthermore, the calcium phosphate treatment is so effective that it is possible to stop the digestion when about 70% of the protein is digested or is converted so that it is non-coagulable on heating. This is an important point since, as the digestion nears completion, there inevitably results some added destruction of the antibodies in the later stages of the digestion process. To obtain an antitoxin solution equivalent in potency, without the calcium phosphate treatment, it is necessary to digest until about 90% of the proteins become non-coagulable on heating. However, digestion to this extent causes some destruction of the antibodies. Any considerable destruction is avoided by stopping the digestion at the 70% point and subsequently removing certain proteins in the manner described in my preferred process.

In addition to the advantages pointed out, the calcium phosphate removes enzyme, coloring matters, lipoids, etc. from the liquid after digestion. The removal of lipoids by the calcium phosphate is an especially outstanding advantage, since it was previously necessary to permit the concentrated antitoxin solutions to stand for several weeks for ageing. During this standing the lipoids separated out and the precipitate was filtered off before the antitoxin was used. By the present process the material can be made and shipped out for use without ageing, since the calcium phosphate completely absorbs the lipoids from the antitoxin solution. The calcium phosphate also removes the pepsin or other enzyme which may remain from the digestion step. This is likewise an important advantage since it permits an even closer approach to the preparation of the ideal antitoxins associated with the least possible foreign matter.

As an additional step which may be utilized, the serum or plasma may be heated prior to the digestion step in order to precipitate fibrin and this precipitate is preferably removed before carrying the process further. In addition, to preserve the antibody activity and to prevent bacterial growth, I find it desirable to add to the serum or plasma a very small amount of a preservative material such as phenol, a mercurial preservative, etc.

As described above, if the digestion is sufficiently complete, a precipitated, undigested portion of the serum protein is separated from the solution which contains the soluble products of digestion and a residual portion of the protein associated with the antitoxin. The antitoxin solution is then concentrated by any suitable method, such as by ultra-filtration, previously described, dialysis and evaporation, precipitation, absorption or the like, until a suitable purification and concentration of antitoxins is established.

In place of the proteolytic enzyme, pepsin, already discussed, I may use other suitable enzymes, or mixtures of the various enzymes. The enzymes, under the conditions prevailing in the digestion procedure, protect the antitoxins or other antibodies from destruction. This is true even though the digestion is carried out in an acid medium which, in the absence of the enzyme, would destroy most, if not all, of the antitoxins. The present process is applicable to the purification of all known antitoxins.

The antitoxins prepared according to my method are used as such for injection into animals or human beings for protecting them against the corresponding toxin. It is evident that the high potency of my material permits the injection of smaller volumes to obtain the same results as were previously obtained with larger volumes of the usual antitoxins. Likewise larger amounts of antibodies may be injected by the use of similar volumes of my products, as compared with the usual antitoxins.

This process is applicable to the purification of all known antitoxins, including diphtheria antitoxin, tetanus antitoxin, erysipelas antitoxin, staphylococcus antitoxin, gas gangrene antitoxins, and the like. It is also applicable to the antitoxins known as antivenoms, such as anticrotalus venom, anti-cobra venom and anti-moccasin venom, and the like. It may also be used in the treatment of the antivirus and antibacterial serums such as antidistemper serum, antipneumococcic serum, antimeningococcic serum, antistaphylococcic serum, antidysenteric serum (both antibacterial and antitoxic), and the like.

I have found that the digestion method described for the purification of antitoxins may also be used for purifying toxins, bacterial antigens and the like. The antigens are purified without substantial loss of antigenicity. Likewise the toxins may be detoxified in the same manner. Pepsin and trypsin have been found especially effective for such materials as diphtheria toxin, staphylococcic toxin, tetanus toxin, meningococcic antigen, etc.

Throughout the specification and claims I have used the term "pH" to describe hydrogen-ion concentration, since the hydrogen-ion concentration is customarily used to measure acidity. Thus when I describe my solutions as being mildly acid and not in excess of pH 4, it is to be understood that this is intended to cover the range of acidity from pH 4 and approaching to neutrality.

Other suitable changes may be made without departing from the spirit and scope of my invention except as defined in the appended claims.

I claim:

1. In a method of purifying antitoxin contained in a solution of serum proteins by selectively digesting the greater portion of the serum proteins with a proteolytic enzyme and without substantial destruction of the antitoxin, the step which comprises treating the solution after the digestion operation with finely divided tricalcium phosphate to absorb undesirable materials in said solution.

2. In a method of purifying antitoxin contained in a solution of serum proteins by selectively digesting the greater portion of the serum proteins with a proteolytic enzyme and without substantial destruction of the antitoxin, the steps which comprise precipitating the coagulable proteins with which are associated the antitoxins, separating and dissolving the precipitated fraction and treating this latter solution with finely divided tricalcium phosphate to absorb undesirable materials from such solution.

3. A method of purifying antitoxin contained in a solution of serum proteins which comprises adding a proteolytic enzyme to such solution and digesting the greater portion of the serum proteins with the enzyme without substantial destruction of the antitoxin, the digestion being carried out under acid conditions but at an acidity not greater than that corresponding to pH 4, filtering the digested solution, subjecting the filtrate to an ultra-filtration operation until the filtrate is concentrated to a specific gravity of about 1.025 to 1.030, adding solid ammonium sulphate to the concentrated filtrate in an amount sufficient to cause precipitation of a fraction of the coagulable proteins with which practically all of the antitoxins are associated, recovering this precipitate and dissolving the same in a small amount of water, dialyzing this solution, diluting the dialyzed solution, adding finely divided tricalcium phosphate to this diluted solution, filtering the solution after it has stood with stirring for some time, concentrating the filtrate obtained by an ultra-filtration operation to give a liquid having a specific gravity of about 1.060.

4. A method of purifying antitoxin contained in a solution of serum proteins which comprises adding pepsin to such solution and digesting the greater portion of the serum proteins with the pepsin without substantial destruction of the antitoxin, the digestion being carried out under acid conditions but at an acidity not greater than that corresponding to pH 4, filtering the digested solution, subjecting the filtrate to an ultra-filtration operation until the filtrate is concentrated to a specific gravity of about 1.025 to 1.030, adding solid ammonium sulphate to the concentrated filtrate in an amount sufficient to cause precipitation of a fraction of the coagulable proteins with which practically all of the antitoxins are associated, recovering this precipitate and dissolving the same in a small amount of water, dialyzing this solution, diluting the dialyzed solution, adding finely divided tricalcium phosphate to this diluted solution, filtering the solution after it has stood with stirring for some time, concentrating the filtrate obtained by an ultra-filtration operation to give a liquid having a specific gravity of about 1.060.

5. A method of purifying antibodies contained in a solution of serum proteins which comprises adding a proteolytic enzyme to such solution and digesting the greater portion of the serum proteins with the enzyme without substantial destruction of the antitoxin, filtering the digested solution, concentrating the filtrate, salting out of the concentrated filtrate a fraction of the coagulable proteins with which practically all of the antibodies are associated, recovering this precipitate and dissolving the same in a small amount of water, treating the last mentioned solution to remove the salting-out medium, removing undesired material from such treated solution by the use of finely divided tricalcium phosphate as an absorbent for such undesired material, removing the tricalcium phosphate from the liquid and concentrating the latter.

6. A method of purifying antibodies contained in a solution of serum proteins which comprises adding a proteolytic enzyme to such solution and digesting the greater portion of the serum proteins with the enzyme without substantial destruction of the antibodies, salting out of the digested solution a fraction of the coagulable proteins with which practically all of the antibodies are associated, recovering the precipitate salted out and dissolving the same in a small amount of water, treating the last named solution for a time with tricalcium phosphate and subsequently removing the tricalcium phosphate from the solution.

7. The method of claim 5 in which about 70% of the serum proteins are digested or become non-coagulable on heating.

8. The method of claim 6 in which the solution of serum proteins is heated to precipitate fibrin and the like prior to the addition of the proteolytic enzyme.

9. The method of claim 6 in which a small amount of a preservative material is added to the solution of serum proteins prior to the addition of the proteolytic enzyme.

IVAN A. PARFENTJEV.